Aug. 31, 1926.
J. M. HICKMAN
1,598,196
PLOW ATTACHMENT FOR TRACTORS
Filed Dec. 26, 1924
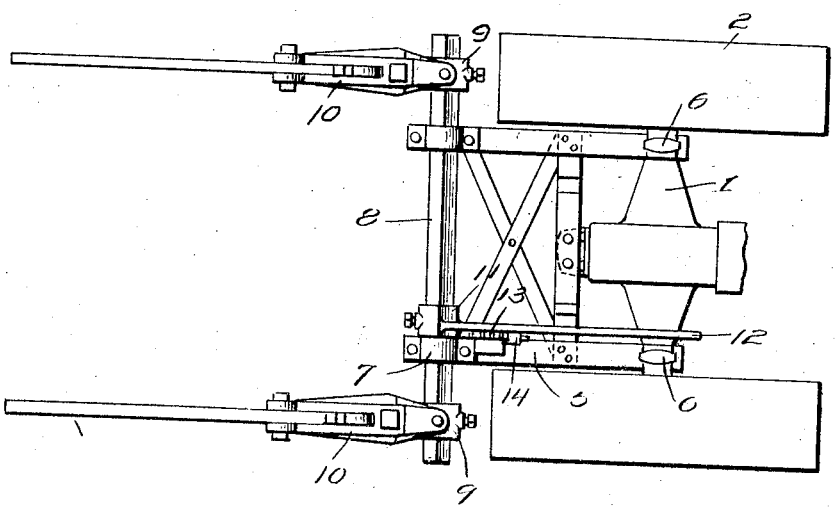
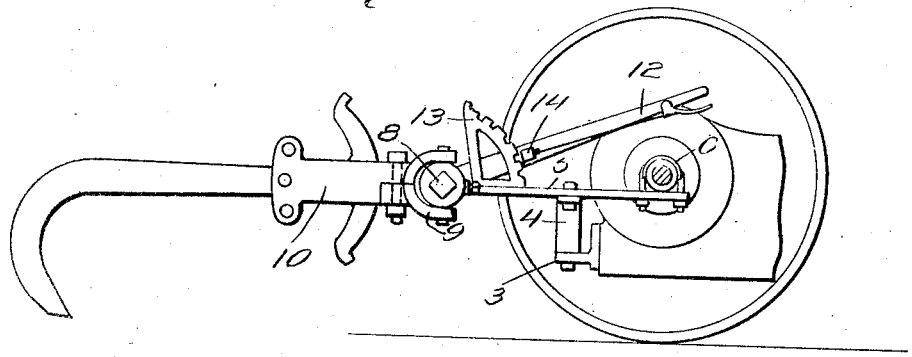
Inventor
J. M. Hickman,
By Clarence A. O'Brien
Attorney Patented Aug. 31, 1926.

1,598,196

UNITED STATES PATENT OFFICE.

JOHN MARION HICKMAN, OF ROSSTON, OKLAHOMA.

PLOW ATTACHMENT FOR TRACTORS.

Application filed December 26, 1924. Serial No. 758,223.

This invention relates to attachments adapted to be applied to a tractor, and with which plows or listers may be connected, and it consists in the novel features hereinafter described and claimed.

An object of the invention is to provide an attachment of the character stated, which is strong and durable and which may be easily and quickly connected with the rear axle of the tractor and supported upon the draw bar cap thereof whereby the soil engaging implements will be properly held with relation to each other and the tractor.

In the accompanying drawing:—

Figure 1 is a top plan view of the attachment, showing the same mounted at the rear portion of a tractor.

Figure 2 is a side elevation of the attachment applied to the tractor, with parts thereof shown in section.

As illustrated in the accompanying drawing, the tractor to which the attachment is applied includes a rear axle 1 supported upon wheels 2 and a draw bar cap 3, supported upon the frame of the tractor at a point between the wheels 2 and below the axle 1. The attachment comprises an approximately U-shaped bar 4, having its intermediate portion mounted upon the draw bar cap 3. Side bars 5 are disposed transversely of the ends of the U-shaped cross bar 4 and the forward ends of the side bars 5 extend under the axle 1, and are secured to the axle by means of clips 6, which are disposed over the upper side of the axle. Bearings 7 are carried at the rear ends of the side bars 5. A shaft 8 is journaled for rotation in the bearings 7 and the said shaft 8 is square in transverse section. Collars 9 are mounted at intervals upon the shaft 8 and are provided with flanges 10, to which plow beams or lister beams (not shown) may be connected. A collar 11 is mounted upon the intermediate portion of the shaft 8 and the lever 12 is fixed to the collar 11. A gear segment 13 is mounted upon one of the side bars 5 and the lever 12 carries a latch device 14, which may engage between the teeth of the gear segments 13, whereby the lever 12 is held at an adjusted position and the shaft 8 is held at a stationary position in the bearings 7.

From the foregoing description taken in conjunction with the illustration in the accompanying drawing, it will be seen that an attachment for a tractor of simple and strong structure is provided and that the same may be easily and quickly applied to the frame of a tractor and when applied will effectually and efficiently retain the plows or listers in proper position with relation to each other and with relation to the tractor.

Having described the invention, what is claimed is:—

A tractor attachment comprising a cross bar which is substantially U-shaped in edge elevation and having its intermediate portion adapted to bear upon the draw bar cap of the tractor, side bars disposed transversely across the ends of the cross bar, and having end portions adapted to extend under the axle of the tractor, means for securing said end portions of the side bars to the axle of the tractor, bearings carried at the rear ends of the said side bars, a noncircular shaft journaled in the bearings, sleeves fitting upon the shaft and having means for connection with the plow beams, a collar mounted upon the shaft, means for securing the collar to the shaft, a lever carried by the collar, and means for fixing the lever at an adjusted position with relation to the side bars.

In testimony whereof I affix my signature.

J. MARION HICKMAN.